(12) United States Patent
Klinger

(10) Patent No.: US 10,136,494 B2
(45) Date of Patent: Nov. 20, 2018

(54) METHOD OF MONITORING THE OPERATING STATUS OF A LIGHT EMITTING DIODE IN A VEHICLE LAMP ARRAY

(71) Applicant: Lear Corporation, Southfield, MI (US)

(72) Inventor: Stefan Klinger, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/784,828

(22) Filed: Oct. 16, 2017

(65) Prior Publication Data

US 2018/0177014 A1    Jun. 21, 2018

(30) Foreign Application Priority Data

Dec. 21, 2016 (DE) .................. 10 2016 225 800

(51) Int. Cl.
*H05B 37/02* (2006.01)
*H05B 33/08* (2006.01)
*B60Q 1/14* (2006.01)
*B60Q 11/00* (2006.01)

(52) U.S. Cl.
CPC ....... *H05B 33/0851* (2013.01); *B60Q 1/1423* (2013.01); *B60Q 11/00* (2013.01); *H05B 33/089* (2013.01); *H05B 33/0815* (2013.01); *H05B 33/0845* (2013.01); *H05B 37/02* (2013.01)

(58) Field of Classification Search
CPC ............ H05B 33/0815; H05B 33/0845; H05B 37/0218; H05B 37/0227; B60Q 1/1423; B60Q 1/143; B60Q 1/1446

USPC ................. 315/77, 82, 185 R, 307
See application file for complete search history.

(56) References Cited

U.S. PATENT DOCUMENTS

| | | | |
|---|---|---|---|
| 6,362,578 B1 | 3/2002 | Swanson et al. | |
| 7,570,037 B2 | 8/2009 | Li et al. | |
| 8,456,388 B2 | 6/2013 | Roberts et al. | |
| 9,769,898 B1 * | 9/2017 | Buthker | H05B 33/0845 |
| 2008/0180414 A1 * | 7/2008 | Fung | G09G 3/3426 345/204 |
| 2012/0112645 A1 * | 5/2012 | Lee | H05B 33/0818 315/186 |
| 2013/0193852 A1 | 8/2013 | Frattini et al. | |
| 2014/0070700 A1 * | 3/2014 | Genthon | H05B 33/0854 315/83 |

(Continued)

*Primary Examiner* — Tung X Le
(74) *Attorney, Agent, or Firm* — MacMillan, Sobanski & Todd, LLC

(57) ABSTRACT

A method of monitoring the operating status of one or more LEDs contained in a vehicle lamp array includes an initial step of calculating which of the LEDs are to be turned on (and/or at what PWM rate those LEDs are to be illuminated) using the desired brightness signals. The PWM rates that correspond with desired brightness signals are stored in a memory device. The stored PWM rates are then sent to one or more switching elements connected between the LEDs and a source of electrical energy. The operating statuses of the LEDs are sent back to the memory device and stored therein. The actual brightness of the LEDs is compared with a predetermined minimum brightness for that LED(s). Lastly, an alarm is generated if the actual brightness of the LEDs is not at least equal to the predetermined minimum brightness for the same LED(s) stored in the memory device.

16 Claims, 3 Drawing Sheets

(56) References Cited

U.S. PATENT DOCUMENTS

| | | | |
|---|---|---|---|
| 2015/0076999 A1* | 3/2015 | Malinin | H05B 33/0815 |
| | | | 315/186 |
| 2015/0334802 A1* | 11/2015 | Ryu | H05B 33/0809 |
| | | | 315/193 |
| 2016/0073470 A1 | 3/2016 | Casper et al. | |
| 2016/0219663 A1* | 7/2016 | Chen | H05B 33/0818 |
| 2017/0034886 A1* | 2/2017 | Gangi | H05B 33/0845 |

\* cited by examiner

METHOD OF MONITORING THE OPERATING STATUS OF A LIGHT EMITTING DIODE IN A VEHICLE LAMP ARRAY

BACKGROUND OF THE INVENTION

This invention relates in general to electronic circuits for operating light emitting diodes (LEDs). In particular, this invention relates to a method of monitoring the operating status of one or more LEDs contained in a vehicle lamp array.

LEDs are commonly used as sources of light in a variety of applications, including vehicles (such as for headlights, taillights, signal lights, and brake lights, for example) and other devices. Typically, each of such LEDs is connected through a switching element to a source of electrical energy. When the switching element is closed, the associated LED is connected to the source of electrical energy. As a result, electrical current flows through the LED, causing it to emit light. Conversely, when the switching element is opened, the associated LED is not connected to the source of electrical energy. As a result, electrical current does not flow through the LED, causing it to not emit light. The closing and opening of the switching element is usually controlled by an electronic controller, which generates electrical control signals to the switching element. In response to such control signals, the switching element is selectively closed and opened to operate the LED in a desired manner.

Although known electronic circuits for operating LEDs have functioned satisfactorily, it is sometimes desirable to monitor the operating status of one or more of the LEDs in order to confirm that they are actually operating in the desired manner. For example, when the LEDs are contained in a vehicle lamp array, it would be desirable to alert a driver of the vehicle when one or more of the LEDs is not functioning in the manner requested, such as on/off status, level of brightness, and the like. Thus, it would be desirable to provide a method of monitoring the operating status of one or more LEDs contained in a vehicle lamp array.

SUMMARY OF THE INVENTION

This invention relates to a method of monitoring the operating status of one or more LEDs contained in a vehicle lamp array. The method includes an initial step of calculating which of the LEDs are to be turned on (and/or at what PWM rate those LEDs are to be illuminated) using the desired brightness signals. The PWM rates that correspond with desired brightness signals are stored in a memory device. The stored PWM rates are then sent to one or more switching elements connected between the LEDs and a source of electrical energy. The operating statuses of the LEDs are sent back to the memory device and stored therein. The actual brightness of the LEDs is compared with a predetermined minimum brightness fur that LED(s). Lastly, an alarm is generated if the actual brightness of the LEDs is not at least equal to the predetermined minimum brightness for the same LED(s) stored in the memory device.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
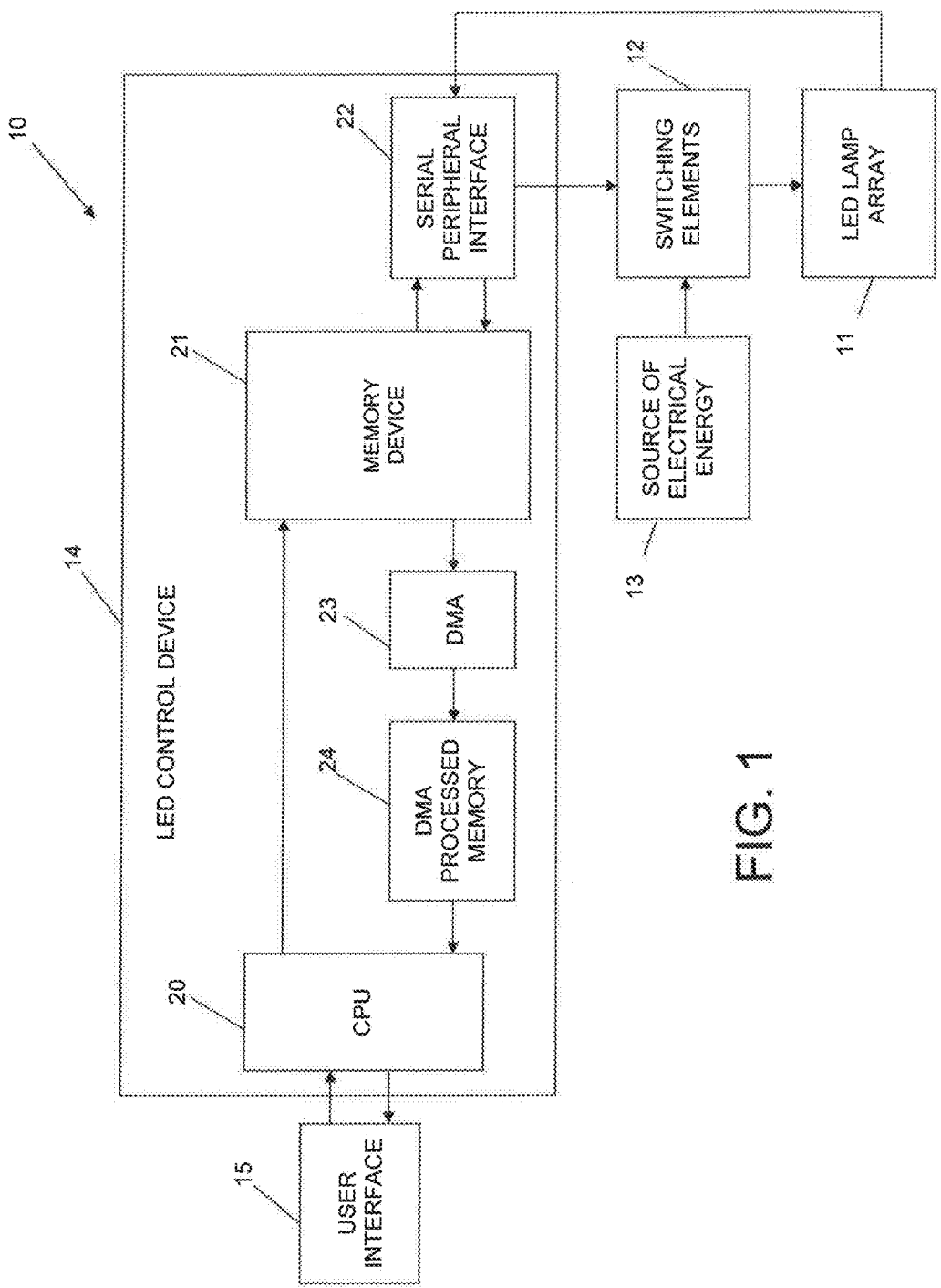
FIG. 1 is a block diagram of an electronic circuit for operating one or more LEDs contained in a vehicle lamp array in accordance with the method of this invention.

Referring now to the drawings, there is illustrated in FIG. 1 a block diagram of an electronic circuit, indicated generally at 10, for operating one or more LEDs contained in an LED lamp array 11 in accordance with the method of this invention. The illustrated LED lamp array 11 includes a plurality of LEDs (not shown) that are operable either individually or as a group in a vehicular lighting system. However, the scope of this invention is not so limited, and the illustrated LED lamp array 11 is intended to be representative of any type of single or plural lighting structure that is used in any type of application.

The basic structure of the electronic circuit 10 is conventional in the art and includes a plurality of switching elements 12 respectively connected between the plurality of LEDs contained in the LED lamp array 11 and a source of electrical energy 13. In a manner that is well known in the art, when one of the switching elements 12 is closed, the LED in the LED lamp array 11 that is associated with that switching element 12 is connected to the source of electrical energy 13. As a result, electrical current flows from the source of electrical energy 13 through that LED, causing it to emit light. Conversely, when the switching element 12 is opened, the LED in the LED lamp array 11 that is associated with that switching element 12 is not connected to the source of electrical energy 13. As a result, electrical current does not flow through that LED, causing it to not emit light.

The closing and opening of the plurality of switching elements 12 is controlled by an LED control device 14 in response to signals received from a conventional user interface 15, which is provided to allow a user to control the operation of the LED lamp array 11 in a desired manner. The LED control device 14 generates electrical control signals to the plurality of switching elements 12. In response to such control signals, the switching elements 1.2 are selectively actuated to be closed and opened to respectively operate the associated LEDs contained in the LED lamp array 11 in a desired manner, as described above.

The LED control device 14 includes a conventional central processing unit (CPU) 20 that receives the input signals from the user interface 15, processes such input signals in accordance with a conventional operating program, and generates output signals through a conventional memory device 21 and a conventional serial peripheral interface 22 to the plurality of switching elements 12. In response to the output signals from the serial peripheral interface 22, the switching elements 12 are closed and opened to operate the plurality of LEDs contained in the LED lamp array 11 in a desired manner. The structure and operation of the LED control device 14 thus far described is conventional in the art.

In a manner that will be explained in greater detail below, the LED lamp array 11 sends the same signals that were sent to the LED lamp array 11 back to the serial peripheral interface 22. These feedback signals represent the actual operating status of one or more of the plurality of LEDs contained in the LED lamp array 11 and may, for example, include on/off status, level of brightness, and the like. These feedback signals are processed by the CPU 20 (using a dynamic memory access technique 23 and a dynamic memory access processed memory 24, which are described further below) to generate an alarm signal to the user interface 15 when one or more of the plurality of LEDs contained in the LED lamp array 11 is not actually functioning in the manner desired by the user. This may occur when, for example, one or more of the plurality of LEDs contained in the LED lamp array 11 is not illuminated (or is not illuminated at a sufficient brightness) as desired by the user.

Figure 2:
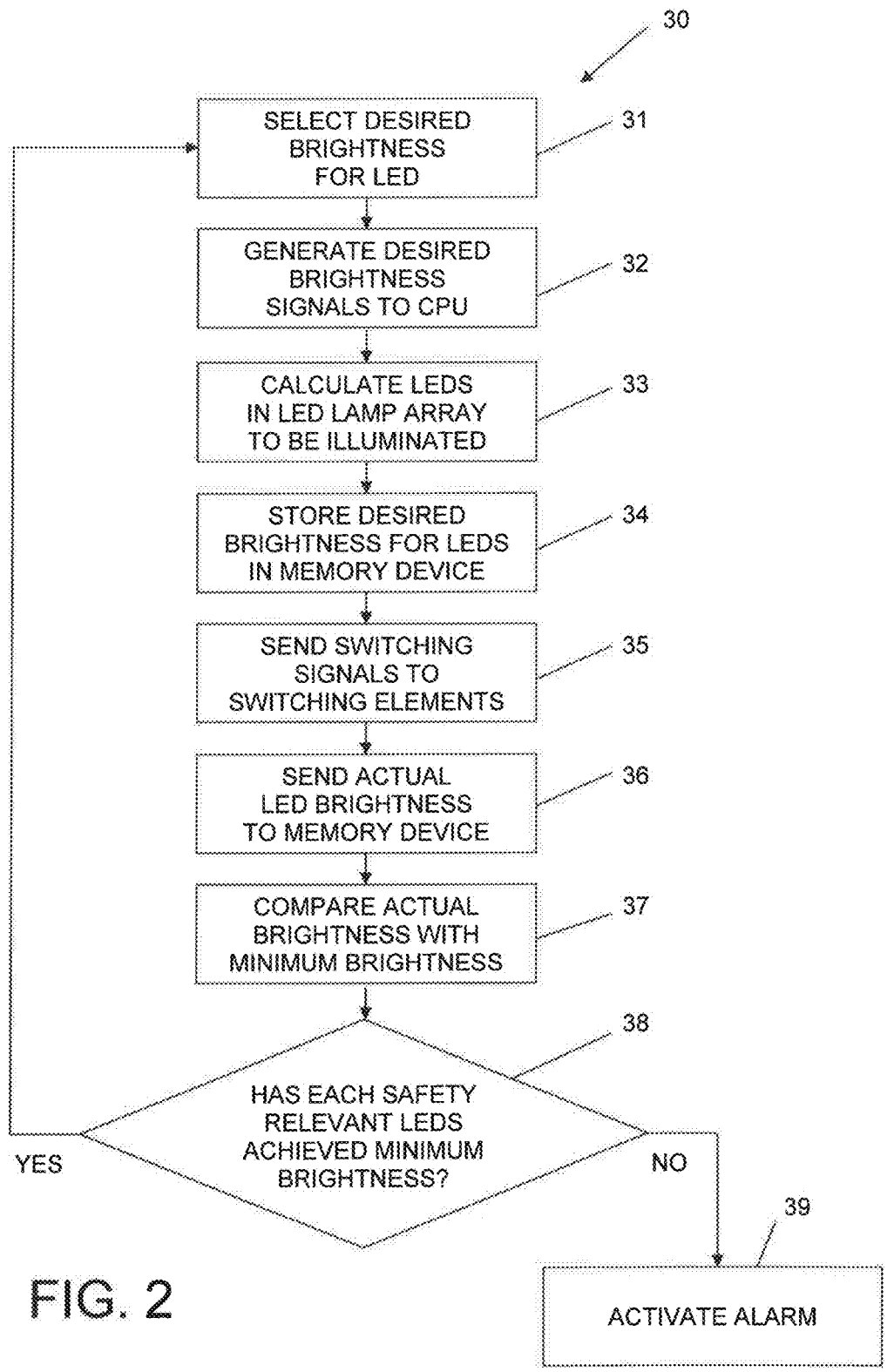
FIG. 2 is a flowchart of the method of this invention for operating the LED control device illustrated in FIG. 1.

FIG. 2 is a flowchart, indicated generally at 30, of a method for operating the LED control device 14 illustrated in FIG. 1. In a first step 31 of the method 30, a user selects a desired brightness for one or more of the LEDs contained in the LED lamp array 11 using the user interface 15. Although the method 30 of this invention will be described and illustrated in the context of a desired brightness for one or more of the LEDs contained in the LED lamp array 11, it will be appreciated that this invention may be used to control and monitor any other operational characteristic of the LEDs contained in the LED lamp array 11. The user interface 15 may be embodied as any conventional device that can accomplish this function.

Next, in a second step 32 of the method 30, the user interface 15 generates one or more desired brightness signals to the CPU 20 in response to the desired brightness selected using the user interface 15.

In a third step 33 of the method 30, the CPU 20 calculates which of the LEDs contained in the LED lamp array 11 are to be turned on (and/or at what PWM rate those LEDs are to be illuminated) using the desired brightness signals from the user interface 15

In a fourth step 34 of the method 30, the PWM rates that correspond with desired brightness signals are stored in the memory device 21 in form of synchronized switching instructions.

In a fifth step 35 of the method 30, the synchronized switching instructions stored in the memory device 21 are sent via the serial peripheral interface 22 to the plurality of switching elements 12 connected between the plurality of LEDs contained in the LED lamp array 11 and a source of electrical energy 13. As discussed above, the switching elements 12 are selectively actuated to be closed and opened to respectively operate the associated LEDs contained in the LED lamp array 11 in a desired manner. The steps of the method 30 thus far described are conventional in the art.

As discussed above, it is desirable to monitor the operating status or statuses of one or more of the LEDs contained in the LED lamp array 11 in order to confirm that it or they are actually operating in the desired manner. To accomplish this, in a sixth step 36 of the method 30, the operating statuses of the LEDs contained in the LED lamp array 11 are sent via the serial peripheral interface 22 back to the memory device 21 and are stored therein.

In a seventh step 37 of the method 30, the actual brightness of one or more of the LEDs contained in the LED lamp array 11 is compared with a predetermined minimum brightness for that LED. The CPU 20 can perform this comparison easily because signals representing both the actual brightness of the LED and the predetermined minimum brightness for that LED have been stored in the memory device 21, as described in detail below, In an eighth step 38 of the method 30, a determination is made by the CPU 20 as to whether the actual brightness of the LED contained in the LED lamp array 11 is at least equal to the predetermined minimum brightness for that LED stored in the memory device 21. If so, the method 30 branches from the eighth step 38 back to the first step 31, and the method 30 is repeated. If not, however, the method 30 branches from the eighth step 38 to a ninth step 39, wherein an alarm is generated to alert the user of the situation. This alarm may, for example, be an audible or visual alarm and may, if desired be incorporated into the user interface 15.

The method 30 may be performed in connection with any desired number of the LEDs contained in the LED lamp array 11, ranging from as few as one to as many as all. However, in the preferred embodiment, the method 30 is performed in connection with only the LEDs contained in the LED lamp array 11 that are deemed as being particularly relevant to the safe operation of the vehicle. For example, if the LEDs contained in the LED lamp array 11 are being illuminated as low-beam headlights of the vehicle, then it may unsafe to operate the vehicle if one or more of such LEDs is not operating to generate an actual brightness that is at least equal to the predetermined minimum brightness for that LED.

Figure 3:
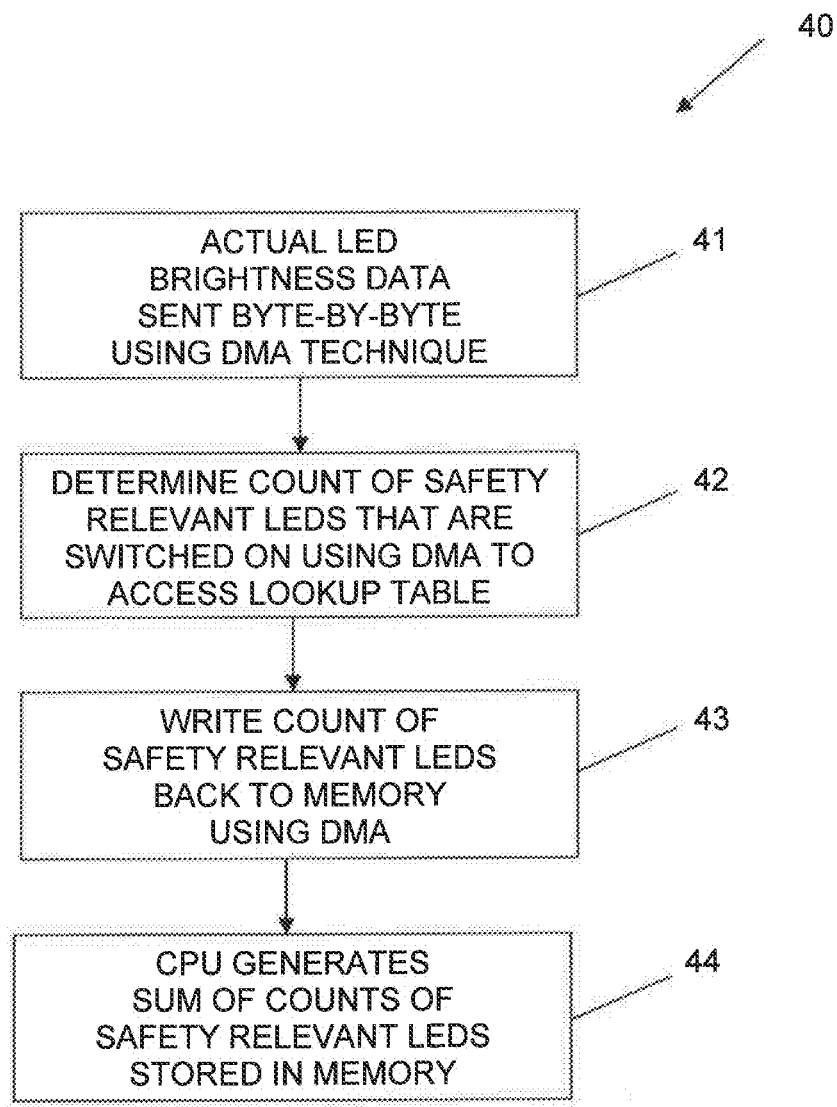
FIG. 3 is a flowchart that shows further details of some of the steps in the method of this invention illustrated in FIG. 2.

FIG. 3 is a flowchart, indicated generally at 40, that shows one embodiment of how steps 36 and 37 in the method 30 illustrated in FIG. 2 may be performed. As discussed above in connection with the sixth step 36 in the method 30, the operating statuses of the LEDs contained in the LED lamp array 11 are sent via the serial peripheral interface 22 back to the memory device 21 and are stored therein. As shown in step 41 of the flowchart 40, this can be accomplished by sending the operating statuses of the LEDs contained in the LED lamp array 11 in a byte-by-byte manner via the serial peripheral interface 22 back to the memory device 21 for storage therein. This is preferably performed using a direct memory access (DMA) technique. As is well known, DMA is a technique of transferring data from the memory device 21 to another part of the electronic circuit 10 without processing it using the CPU 20. While most data that is input or output from the electronic circuit 10 is processed by the CPU 20, this particular data does not require any processing by the CPU 20. Thus, using the DMA technique to take this data in a byte-by-byte manner from a receive memory buffer of the serial peripheral interface 22 saves processing time and significantly improves efficiency.

As shown in step 42 of the flowchart 40, the data regarding the operating statuses of the LEDs contained in the LED lamp array 11 is then used to determine a count of the some or all of the LEDs contained in the LED lamp array 11 (such as the safety relevant LEDs, for example) that are switched on (at least for a certain period of time). This can be accomplished using the DMA technique to locate corresponding data stored in one or more look up tables provided in the memory device 21. In this manner, a count of the safety relevant LEDs that are switched on (at least for a certain period of time) can be determined.

As shown in step 43 of the flowchart 40, this count of the safety relevant LEDs that are switched on (at least for a certain period of time) is written back to the receive memory buffer of the serial peripheral interface 22. Again, it is preferable that this step be performed using the DMA technique to save processing time and improve efficiency.

Lastly, as discussed above in connection with the seventh step 37 in the method 30, the actual brightness of the LEDs contained in the LED lamp array 11 is compared with a predetermined minimum brightness for those LEDs. As shown in step 44 of the flowchart 40, this can be accomplished by the CPU 20 generating a sum of the counts of some or all of the LEDs contained in the LED lamp array 11 (such as the safety relevant LEDs, for example). The CPU 20 can perform this function quickly and easily because it only needs to sum up the counts of the LEDs contained in the LED lamp array 11 (such as the safety relevant LEDs, for example) that are stored in the receive memory buffer of the serial peripheral interface 22. In this manner, a lot of processing time by the CPU 20 can be saved.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of monitoring the operating status or statuses of one or more LEDs contained in an LED lamp array comprising the steps of:
    (1) generating one or more desired brightness signals for one or more LEDs contained in an LED lamp array;
    (2) calculating which of the one or more LEDs contained in the LED lamp array is or are to be turned on using the one or more desired brightness signals;
    (3) storing PWM rates that correspond with the one or more desired brightness signals in a memory device;
    (4) sending the stored PWM rates to one or more switching elements connected between the one or more LEDs contained in the LED lamp array and a source of electrical energy;
    (5) sending the operating status or statuses of the one or more LEDs contained in the LED lamp array back to the memory device and storing the operating status or statuses of the one or more LEDs contained in the LED lamp array therein, wherein the operating status or statuses include an actual brightness of the one or more LEDs contained in the LED lamp array;
    (6) comparing the actual brightness of the one or more of the LEDs contained in the LED lamp array with a predetermined minimum brightness for the one or more of the LEDs contained in the LED lamp array; and
    (7) generating an alarm if the actual brightness of the one or more LEDs contained in the LED lamp array is not at least equal to the predetermined minimum brightness for the same LEDs stored in the memory device.

2. The method defined in claim 1, including an initial step of selecting a desired brightness for one or more LEDs contained in the LED lamp array using a user interface, and wherein step (1) is performed by generating the one or more desired brightness signals for one or more LEDs contained in the LED lamp array selected using the user interface.

3. The method defined in claim 1, wherein step (3) is performed by storing the PWM rates that correspond with the one or more desired brightness signals in the memory device in form of synchronized switching instructions.

4. The method defined in claim 3, wherein step (4) is performed by sending the synchronized switching instructions stored in the memory device via a serial peripheral interface.

5. The method defined in claim 4, wherein step (5) is performed by sending the operating statuses of the LEDs contained in the LED lamp array via the serial peripheral interface back to the memory device and storing the operating status or statuses of the one or more LEDs contained in the LED lamp array therein.

6. The method defined in claim 1, wherein step (5) is performed by sending the operating statuses of the LEDs contained in the LED lamp array in a byte-by-byte manner via a serial peripheral interface.

7. The method defined in claim 1, wherein step (5) is further performed by determining a count of the some or all of the LEDs contained in the LED lamp array.

8. The method defined in claim 1, wherein step (5) is further performed by determining a count of the some or all of the LEDs contained in the LED lamp array that are switched on using a direct memory access technique.

9. The method defined in claim 8, wherein the count of the LEDs that are switched on is written back to a receive memory buffer of a serial peripheral interface.

10. The method defined in claim 9, wherein step (6) is performed by generating a sum of the counts of some or all of the LEDs contained in the LED lamp array.

11. A method of monitoring a plurality of LEDs contained in an LED lamp array comprising the steps of:
    (1) generating desired brightness signals that represent a desired brightness for a plurality of LEDs contained in an LED lamp array;
    (2) sending the desired brightness signals to a plurality of switching elements connected between the plurality of LEDs contained in the LED lamp array and a source of electrical energy;
    (3) sending actual brightness signals of the plurality of LEDs contained in the LED lamp array to the memory device and storing the operating status or statuses of the one or more LEDs contained in the LED lamp array therein;
    (4) storing a predetermined minimum brightness for the plurality of LEDs contained in the LED lamp array in the memory device;
    (5) comparing the actual brightness of the plurality of LEDs contained in the LED lamp array with the predetermined minimum brightness for the plurality of LEDs contained in the LED lamp array; and
    (6) generating an alarm if the actual brightness of the plurality of LEDs contained in the LED lamp array is not at least equal to the predetermined minimum brightness for the plurality of LEDs contained in the LED lamp array.

12. The method defined in claim 11, wherein step (2) is performed by storing the desired brightness signals in the memory device and sending the stored desired brightness signals from the memory device to the plurality of switching elements.

13. The method defined in claim 11, wherein step (2) is performed by storing the desired brightness signals as a plurality of PWM rates in the memory device and sending the stored plurality of PWM rates from the memory device to the plurality of switching elements.

14. The method defined in claim 11, wherein step (5) is performed by determining a count of the plurality of LEDs contained in the LED lamp array that are switched on with the predetermined minimum brightness for the plurality of LEDs contained in the LED lamp array.

15. The method defined in claim 11, wherein step (5) is performed by determining a sum of counts of the plurality of LEDs contained in the LED lamp array that are switched on with the predetermined minimum brightness for the plurality of LEDs contained in the LED lamp array.

16. The method defined in claim 11, wherein step (5) is performed using a direct memory access technique.

\* \* \* \* \*